J. W. FAY.
ELECTRODE FOR ARC WELDING.
APPLICATION FILED FEB. 27, 1920.

1,359,976.

Patented Nov. 23, 1920.

INVENTOR:
JOSEPH W. FAY.

Andrews + Lundell
ATTORNEYS

UNITED STATES PATENT OFFICE.

JOSEPH W. FAY, OF MILWAUKEE, WISCONSIN.

ELECTRODE FOR ARC-WELDING.

1,359,976.   Specification of Letters Patent.   Patented Nov. 23, 1920.

Application filed February 27, 1920. Serial No. 361,832.

*To all whom it may concern:*

Be it known that I, JOSEPH W. FAY, a citizen of the United States, residing at Milwaukee, in the county of Milwaukee and State of Wisconsin, have invented certain new and useful Improvements in Electrodes for Arc-Welding, of which the following is a specification.

This invention relates to electrodes used for electric welding purposes, and has for an object providing an improved form of electrode for the purpose, particularly with reference to the insulation which covers the electrode. One object of the invention is to produce an electrode which is covered by insulating material in such a manner as to maintain substantially constant the temperature of the electrode while it is in use, without reference to its length, and otherwise to maintain the most suitable conditions for carrying on the work of welding. Other objects of the invention will be apparent from a consideration of the accompanying drawings and the following description thereof.

Figure 1:
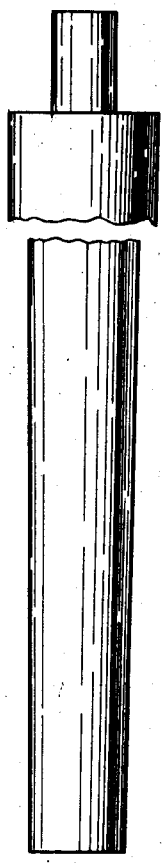
Figure 2:
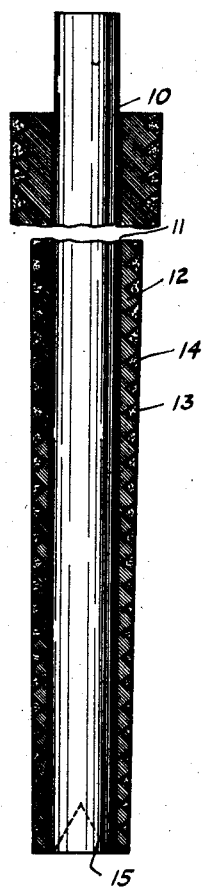
Figure 3:
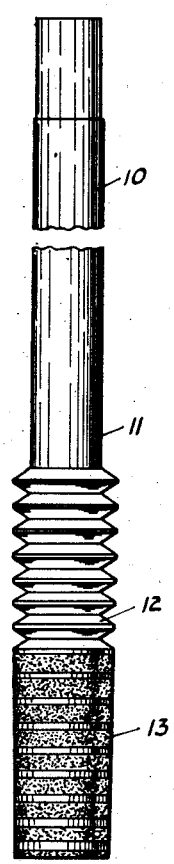
Figure 4:
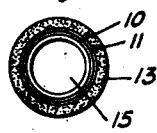

Of the drawings Figure 1 is an elevation of an electrode which embodies features of my invention; Fig. 2 is a central longitudinal section of the electrode; Fig. 3 is an elevation of the electrode with certain portions of the covering broken away; Fig. 4 is a view of the arc end of the electrode.

Any suitable material may be used for the electrode proper, that is the metallic core, and it may be of any suitable shape, diameter and length. In a general way my electrode is particularly adapted to machine welding when the electrode is very long. I prefer for the purpose the metal bar 10. The entire length of that portion of the bar which is to be deposited on the seam to be welded is inclosed in a coating of heat resisting cement 11. Any suitable cement may be used for the purpose, but I prefer a coat of asbestos cement. Outside of this coat of cement is applied a thick coating of paper 12, any suitable paper being used for the purpose. And the paper is applied in such a manner as to taper in thickness from one end to the other, the coating of paper on the arc end of the electrode being thinner than at the upper end. The amount of the tapering of the paper should vary with the length of the electrode and the particular conditions of the welding process, but in general I prefer a variation in thickness substantially as indicated in Fig. 2. The surface of the paper is materially roughened in any suitable manner so as to form material depressions or grooves for the reception of an outer coating of cement. While I do not wish my invention to be considered as confined to any particular form of grooves or depressions on the surfaces of the paper, yet I prefer for this purpose annular V-shaped grooves positioned close together, equally spaced, but diminishing in size toward the arc end, and extending from one end of the insulation to the other, substantially as indicated in Fig. 2.

In the process of manufacturing my electrode, when the grooves or corrugations are formed in the surface of the paper the paper is soaked in a solution of cement, such as a mixture of asbestos cement and sodium silicate, which penetrates the paper more or less and forms a coating 13 on the surface thereof. The corrugations are then pressed full of cement and the entire surface of the thin coat of cement on the paper is covered by this outer coat. Any suitable material may be used for filling the corrugations and the outer coat. I prefer for the purpose the asbestos cement 14.

One object of tapering the insulation as shown and described is to insure an even fusing temperature throughout the entire length of the electrode, especially in the case of electrodes that are very long, for instance six feet or more in length, and which are used in machine welding. In such cases there is a material increase in temperature in the body of the electrode as the terminal or supporting end is being approached by the arc, and this excessive temperature weakens the quality of the insulation as the electrode decreases in length, and thus causes a poor weld and makes it difficult to carrying on the welding automatically on account of the variations in the fusing of the electrode. The object which I have in view is to deposit the metal on the seam to be welded at a uniform time rate regardless of the length of the electrode. If the speed of the machine and the current of electricity passing through the arc will deposit one inch of metal to one inch of the seam in one second, in the beginning, the finishing end of the electrode should deposit the same amount of metal in the same length of time. An electrode with uniform thickness of insulation throughout the entire length will fuse faster as the electrode decreases in length due to the weakness of the insulation caused by the increase of the temperature as the electrode shortens in length.

One of the objects of applying a coating of cement 11 to the surface of the metal rod is to prevent the paper coat 12 from charring due to the heat passing to the paper from the body of the metallic rod. One of the objects of the paper is to provide suitable supporting means for holding the body of the cement to the electrode. An electrode covered entirely with paper, although impregnated with the best impregnated compound, would not be of a high enough quality of insulation without the use of cement, hence it is desirable to apply the cement in the manner described; and if a heavy coating of cement is applied to the surface of the paper without threading or nurling the paper or producing other suitable depressions therein, the cement would crack or peel off. And the asbestos and sodium silicate solution in which the paper is soaked, provides a suitable binder between the paper and the thick coating of cement, and thus also assist in preventing cracking or peeling off of the cement.

I also provide means in connection with the arc end of the electrode to facilitate the starting of the arc. With an ordinary metal electrode some difficulty is usually encountered in properly starting the arc. Occasionally the arc will fuse to the work, if not properly handled. I have discovered that, providing means for increasing materially the resistance to the flow of electricity per unit length immediately at the arc end of the electrode, and thus increasing the temperature of this portion of the electrode sufficiently, will prevent the tendency of the electrode sticking to the work or other disadvantages in starting the arc. This is so because the portion of the electrode which comes in contact with the arc, while allowing the current to start, will raise the temperature of the end sufficiently to fuse and perhaps vaporize the metal, and thus materially simplifies the starting of the arc. For this purpose any suitable means may be provided, but I prefer to provide in the arc end of the electrode a depression 15 so formed as to leave an annular ring of metal which comes in contact with the work and thus starts the flow of the electric current. The walls of the annular ring are so thin that the metal quickly melts and properly starts the arc without the necessity of moving the electrode backward from the work at exactly the right instant. By this arrangement the operator of the electrode, in starting the arc, need not be so exact, and the danger of fusing to the work and other disadvantages are eliminated. It is to be understood, however, that the form of the depression or the method of reducing the mass of the metal on the end of the electrode, is not essential so far as the spirit of my invention is concerned, it being necessary only to remove sufficient mass of the metal to cause high resistance to the flow of electricity through the end of the electrode, and to reduce the mass to such a point that it will very quickly be melted and more or less vaporized. And it is further to be understood that any electric conducting means may be applied to the arc end of the electrode for the purpose of thus starting the arc, provided only that the resistance is such as to properly fuse and vaporize the conductor in the manner herein stated.

I claim as my invention:

1. An electrode for welding purposes comprising a bar of metal, a coat of cement on said bar, a wrapping of paper around said cement, a thin coat of cement penetrating into the pores of said paper and surrounding the outer surface thereof, and a thick coat of cement covering said last mentioned coat of cement.

2. An electrode for welding purposes comprising a bar of metal, a coat of cement on said bar, a thick coat of paper covering the said cement, said paper having depressions therein, and a coat of cement filling said depressions and covering said paper.

3. An electrode for welding purposes comprising a bar of metal, a coat of cement on said bar, a thick coat of paper covering the said cement, said paper having depressions therein, and a coat of cement filling said depressions and covering said paper, the thickness of the paper in the neighborhood of the arc end of the electrode being thicker than the thickness of the paper in the neighborhood of the other end of the electrode.

4. An electrode for welding purposes comprising a bar of metal, a coat of cement on said bar, a thick coat of paper covering the said cement, said paper having depressions therein, and a coat of cement filling said depressions and covering said paper, the depressions in said paper extending from one end of the paper coat to the other end, and being smaller near the arc end of the electrode than near the other end.

5. An electrode for welding purposes comprising a bar of metal, a coat of cement on said bar, a thick coat of paper covering the said cement, said paper having depressions therein, and a coat of cement filling said depressions and covering said paper, the thickness of the outer coat of cement being less near the arc end of said electrode than near the other end.

6. An electrode for welding purposes comprising a bar of metal, a coat of cement on said bar, a thick coat of paper covering the said cement, said paper having depressions therein and a coat of cement filling said depressions and covering said paper, the depressions in said paper comprising annular V-shaped grooves extending equally spaced from one end of the paper coat to the other.

In testimony whereof, I hereunto set my hand.

JOSEPH W. FAY.